(12) United States Patent
Williams et al.

(10) Patent No.: US 12,056,899 B2
(45) Date of Patent: Aug. 6, 2024

(54) FREE-VIEWPOINT METHOD AND SYSTEM

(71) Applicant: Sony Interactive Entertainment Inc., Tokyo (JP)

(72) Inventors: Nigel John Williams, London (GB); Andrew William Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/182,669

(22) Filed: Mar. 13, 2023

(65) Prior Publication Data

US 2023/0215047 A1 Jul. 6, 2023

Related U.S. Application Data

(62) Division of application No. 17/007,174, filed on Aug. 31, 2020, now Pat. No. 11,710,256.

(30) Foreign Application Priority Data

Sep. 5, 2019 (GB) .................................... 1912769

(51) Int. Cl.
| | | |
|---|---|---|
| *G06T 7/80* | (2017.01) | |
| *G06F 1/03* | (2006.01) | |
| *G06F 3/01* | (2006.01) | |
| *G06T 5/50* | (2006.01) | |
| *G06T 7/593* | (2017.01) | |
| *G06T 15/20* | (2011.01) | |

(Continued)

(52) U.S. Cl.
CPC .................. *G06T 7/80* (2017.01); *G06F 1/03* (2013.01); *G06F 3/012* (2013.01); *G06T 5/50* (2013.01);
(Continued)

(58) Field of Classification Search
CPC .. G06T 7/80; G06T 5/50; G06T 7/593; G06T 15/205; G06T 17/00; G06T 2200/08;
(Continued)

(56) References Cited

U.S. PATENT DOCUMENTS

2004/0247174 A1 * 12/2004 Lyons ...................... G06T 7/55
382/154
2013/0129192 A1 * 5/2013 Wang ................... H04N 13/111
382/154

(Continued)

FOREIGN PATENT DOCUMENTS

| EP | 3223245 A1 | 9/2017 |
| EP | 3499897 A1 | 6/2019 |
| EP | 3509037 A1 | 7/2019 |

OTHER PUBLICATIONS

Combined Search and Examination Report for corresponding GB Application No. GB118150, 5 pages, dated Mar. 6 6, 2020.

(Continued)

*Primary Examiner* — Kathleen Y Dulaney
(74) *Attorney, Agent, or Firm* — Matthew B. Dernier, Esq.

(57) ABSTRACT

Methods and/or apparatus provide for obtaining intrinsics and extrinsics of a plurality of cameras arranged to capture a scene and based thereon, generate a voxel representation of the scene; obtaining extrinsics and intrinsics of a virtual camera; mapping the extrinsics and intrinsics of the virtual camera to at least one voxel surface defined in a data structure and to identify at least one camera pair suitable for obtaining depth data for that voxel surface based on the corresponding camera pair identifier; and receiving an input from the mapping unit, and in response obtaining images captured by the cameras in the at least one camera pair identified as being suitable for reconstructing the scene from the viewpoint of the virtual camera, and to generate an image of the scene from the viewpoint of the virtual camera based on the obtained images.

12 Claims, 10 Drawing Sheets

(51) Int. Cl.
*G06T 17/00* (2006.01)
*H04N 13/00* (2018.01)
*H04N 13/106* (2018.01)
*H04N 13/111* (2018.01)

(52) U.S. Cl.
CPC ............ *G06T 7/593* (2017.01); *G06T 15/205* (2013.01); *G06T 17/00* (2013.01); *H04N 13/106* (2018.05); *H04N 13/111* (2018.05); *G06T 2200/08* (2013.01); *G06T 2207/20021* (2013.01); *G06T 2207/20216* (2013.01); *H04N 2013/0081* (2013.01)

(58) Field of Classification Search
CPC . G06T 2207/20021; G06T 2207/20216; G06T 7/55; G06T 15/20; G06T 19/003; G06F 1/03; G06F 3/012; G06F 3/011; H04N 13/106; H04N 13/111; H04N 2013/0081; H04N 13/246; H04N 13/243; H04N 13/388; H04N 21/21805
USPC .................................. 382/154; 345/633, 424
See application file for complete search history.

(56) References Cited

U.S. PATENT DOCUMENTS

| | | | | |
|---|---|---|---|---|
| 2014/0132718 | A1* | 5/2014 | Suh .................... | H04N 21/4345 348/43 |
| 2014/0232717 | A1 | 8/2014 | Schpok | |
| 2014/0267420 | A1* | 9/2014 | Schowengerdt ...... | G06T 19/006 345/633 |
| 2015/0201176 | A1* | 7/2015 | Graziosi .............. | H04N 13/243 348/43 |
| 2015/0279121 | A1* | 10/2015 | Myers .................... | G01B 11/26 345/424 |
| 2018/0180733 | A1 | 6/2018 | Smits | |
| 2018/0288389 | A1 | 10/2018 | Kirmani | |
| 2018/0329485 | A1* | 11/2018 | Carothers ............. | G06T 19/006 |
| 2018/0352215 | A1* | 12/2018 | Iwakiri ................ | H04N 13/282 |
| 2019/0012804 | A1* | 1/2019 | Wang ...................... | G06T 7/593 |
| 2019/0213789 | A1* | 7/2019 | Uyyala ................... | G06T 17/005 |
| 2019/0266780 | A1* | 8/2019 | Le Floch ................ | G06T 15/04 |
| 2019/0325608 | A1* | 10/2019 | Taya ...................... | G06T 7/248 |
| 2019/0364265 | A1* | 11/2019 | Matsunobu .......... | H04N 13/194 |
| 2020/0104030 | A1* | 4/2020 | Dedual ............... | G06F 3/04815 |
| 2020/0184710 | A1* | 6/2020 | Besley ..................... | G06T 19/00 |
| 2021/0074023 | A1* | 3/2021 | Williams .................. | G06T 7/55 |
| 2021/0133929 | A1* | 5/2021 | Ackerson ................ | G06T 9/001 |
| 2021/0142551 | A1* | 5/2021 | Kobayashi ............. | G06T 15/04 |
| 2021/0243472 | A1 | 8/2021 | Jung | |

OTHER PUBLICATIONS

Extended European Search Report for corresponding EP Application No. 20190100.6, 8 pages, dated Nov. 6, 2020.

Claire Lartigue, et al., "Voxel-based Path Planning for 3D Scanning of Mechanical Parts" Computer-Aided Design and Applications, vol. 11, No. 2, 10 pages, Mar. 4, 2014.

* cited by examiner

FREE-VIEWPOINT METHOD AND SYSTEM

CROSS REFERENCE TO RELATED APPLICATIONS

This is a divisional application of U.S. patent application Ser. No. 17/007,174, accorded a filing date of Aug. 31, 2020 (pending), which claims priority to GB Application No. 1912769.5, filed Sep. 5, 2019, the entire disclosures of which are hereby incorporated by reference.

BACKGROUND OF THE INVENTION

Field of the Invention

The present disclosure relates to a free-viewpoint method and system.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also contributes to this.

While video games may be provided that can offer such an experience, the approaches taken to provide immersiveness in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content.

It is in view of the above considerations that free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment.

A number of challenges exist when seeking to provide high-quality image or video content with a free viewpoint. A number of such problems derive from the limitations of the content capturing systems that are used; for example, it may be difficult to capture sufficient image information due to occlusions or the like. In addition to this, information that may be required to generate additional viewpoints (such as lighting information or depth information) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided. It is therefore considered that alternative modifications to the free viewpoint content generating may be advantageous.

In some free viewpoint systems, a plurality of cameras are positioned around a scene and depth data is obtained from stereo-images captured by respective pairs of cameras. The colour information obtained from images is combined with the obtained depth data and used to generate a 3D reconstruction of the scene. Typically, the colour information provides the x and y coordinates of individual pixels, and the depth information provides the corresponding z-coordinates of those pixels.

One known technique for generating 3D reconstructions involves iterating over every camera pair so as to extract any meaningful volumetric data from the stereoscopic images captured by the respective camera pairs. However, in some situations, this may result in the comparison of images having no common image data and from which no depth data can be obtained. For example, such may be the case if two cameras are facing each other from opposite ends of a stadium. Moreover, in some situations, it may be that depth data is obtained for a given camera pair, for a given part of the scene, but in actuality, there is a different camera pair better suited for obtaining depth data for that part of the scene. For example, it may be that a different camera pair provides a higher depth resolution for that part of the scene. In any case, the indiscriminate processing of images captured by each camera pair is an inefficient use of time and processing power. The present disclosure seeks to address or at least alleviate these problems.

SUMMARY OF THE INVENTION

The present disclosure is defined by the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

It is known in the art that depth data can be obtained from stereoscopic images, i.e. images captured by a respective pair of cameras having at least partially overlapping fields of view. However, for scenes in which multiple cameras provide coverage, it may not be efficient in terms of time and computing power, to attempt to obtain depth data for every camera pair permutation. In some examples, it may be that there is no overlap between the fields of view of a given camera pair, and so an attempt obtain depth data from the corresponding images is futile. Moreover, in some examples, it may be that there is a given camera pair that is able to obtain depth data for a given portion of the scene at a greater depth resolution relative to other camera pairs, but that depth data is still extracted from the images captured by the other camera pairs. Again, this results in an inefficient use of time and resources when generating a reconstruction of a scene from a desired viewpoint. The present disclosure provides a data structure that may be used to alleviate at least some of these problems.

Pre-Computation of the Data Structure

A method of generating a data structure for facilitating the 3D reconstruction of a scene, or region thereof, will now be described. In the below-described method, it is assumed that the extrinsics (position and orientation) and intrinsics (e.g. focal length, principal point) are known for the cameras positioned around the scene.

Figure 1:
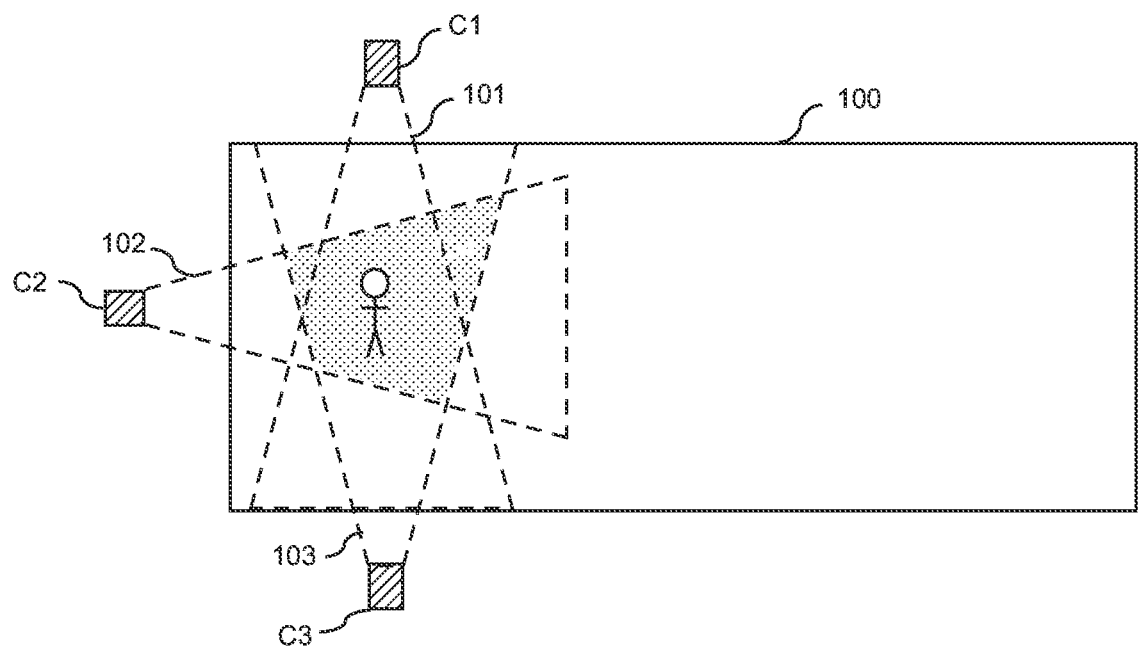
FIG. 1 shows schematically a plurality of cameras arranged to capture images of a scene.

At a first step, a map corresponding to areas of overlap between the frustums of camera pairs is generated. Referring now to the drawings, wherein like reference numerals designate identical or corresponding parts throughout the several views, an example of this is shown in FIG. 1, where three cameras C1, C2, C3 are shown as being positioned around one end of a capture area. The corresponding frustums 101, 102, 103 of the cameras is shown in two dimensions, from a top-down view. It will be appreciated that these frustums will have a volume, corresponding to the volume of scene that falls within the corresponding camera's field of view. The frustums for the cameras may be determined using the extrinsics and intrinsics associated with the cameras. In FIG. 1, the capture area may correspond to e.g. a football pitch, and the subject may correspond to a football player.

In FIG. 1, a shaded region 104 is shown; this region corresponds to the area of overlap between the frustrums of cameras C2 and C3. This region corresponds to a volume of space that is within the field of view of each camera forming the camera pair C23.

Figure 2:
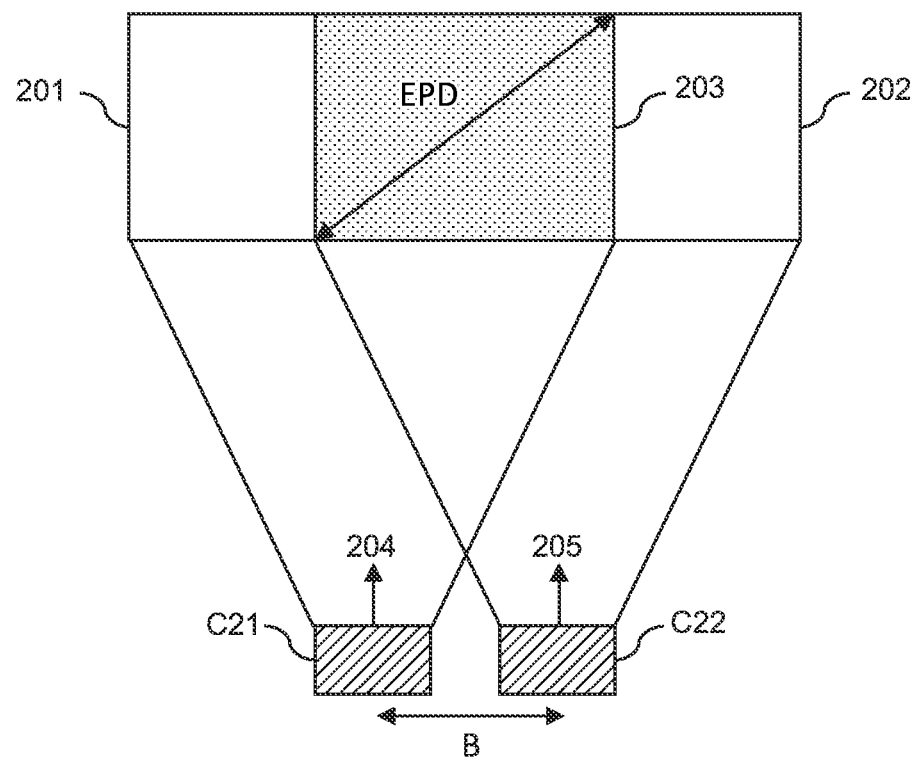
FIG. 2 shows schematically the epipolar diagonal associated with a pair of cameras.

Generating the map of overlapping frustums may involve determining, for each camera pair, an epipolar diagonal associated with the images captured by the cameras in that camera pair. An example of this is shown in FIG. 2, which shows the images 201, 202 captured by a pair of parallel cameras C21, C22 separated by a distance, B (baseline). In FIG. 2, the shaded region 203 corresponds to the region of overlap between the images captured by the respective cameras. Each non-shaded region corresponds to an area of an image captured by one camera that is not within the field of view of the other camera, and from which depth data cannot be obtained by stereo-matching. The optical axis of each camera is indicated with arrows 204, 205 respectively.

The epipolar diagonal provides an indication of the degree of overlap between the images captured by the cameras in a camera pair. In FIG. 2, the epipolar diagonal is shown as corresponding to the distance between opposing corners of the overlapping image region. Generally, the larger the epipolar diagonal associated with a given camera pair, the greater the amount of depth information that can be obtained from the images captured by that camera pair. An epipolar diagonal of zero may indicate that there is no overlapping field of view for the corresponding camera pair.

The epipolar diagonal may be determined for each camera pair, with each camera pair corresponding to a different combination of two cameras positioned in and around the capture area. In some examples, the images captured by each camera pair are cropped and rectified, and the epipolar diagonal is determined for each camera pair based on the cropped and rectified images. In FIG. 1, there are three different camera pairs (C1 and C2; C2 and C3; and C1 and C3) each having a respective epipolar diagonal value (EPD12, EPD23, EPD31) associated therewith. In FIG. 1. EPD31 may equal zero, since the cameras are facing each other (i.e. have antiparallel optical axes) and will have no common image data from which stereo-matching can be performed. Alternatively, in such a case a flag or other indicator either that no epipolar diagonal exists or that a pair do not overlap may be used.

Having determined the extent of overlap between the frustums of each camera pair, the method further comprises defining a volume of space that encloses the capture area, or a particular region of interest within the capture area. This volume may be sub-divided into sub-units, for example, in the form of voxels. The voxels may be sub-divided further, as will be described below. In the present disclosure, the volume enclosing the capture area or region of interest is referred to as the capture volume.

Figure 3:
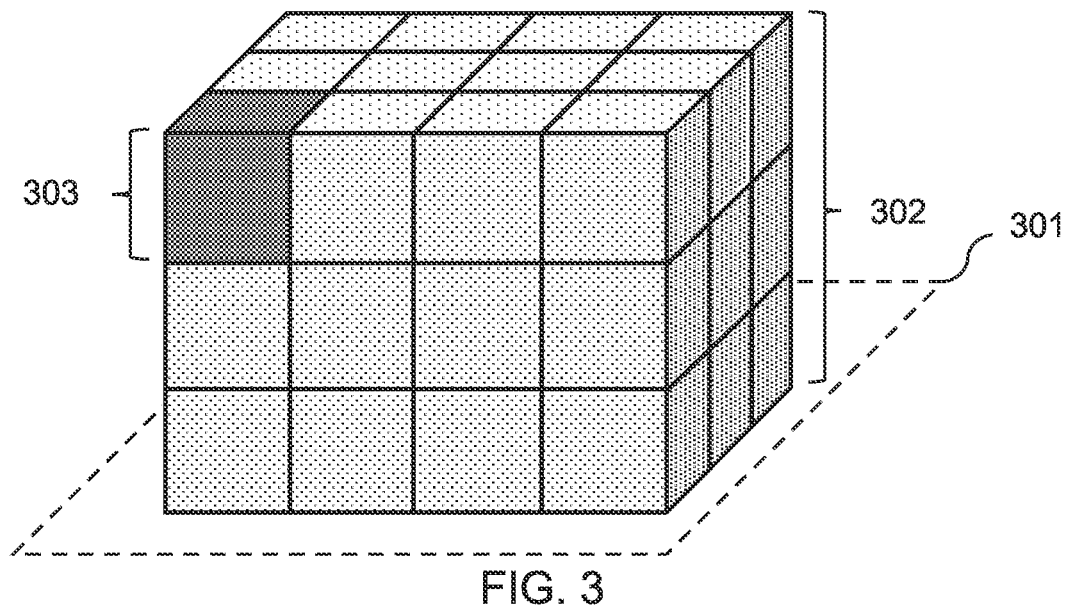
FIG. 3 shows schematically an example of a voxel representation of a scene.

In some examples, the capture volume may correspond to a polyhedron, such as e.g. a rectangular cuboid that encloses the capture area. An example of this is shown in FIG. 3, which shows the capture area 301 (e.g. a football pitch) enclosed by a cuboid 302. In FIG. 3, the cuboid is shown as being divided into voxels 303 of equal size. Each voxel 303 corresponds to a different segment of 3D space within the capture area.

The method further comprises determining, for each sub-unit (e.g. voxel) of the volume enclosing the capture area, the corresponding camera pairs that provide coverage of that sub-unit. This may be determined using the map of overlapping camera frustums (generated as above). A pair of cameras are said to provide coverage of a given sub-unit if that sub-unit is within the overlapping fields of view of the cameras in the camera pair. In other words, if it is possible to obtain depth data for at least part of the scene within the sub-unit, for a given camera pair.

For the camera pairs that provide coverage of a given sub-unit, the distance between the principal points of each camera in a respective pair is determined. The principal point corresponds to the point of intersection between the optical axis and image plane of the camera. This point is usually at the centre of the image plane and corresponds to the point of the scene that is in focus. As mentioned above, the principal points for each camera positioned around (and within) the capture area may be known in advance (i.e. as camera intrinsics).

Figure 4:
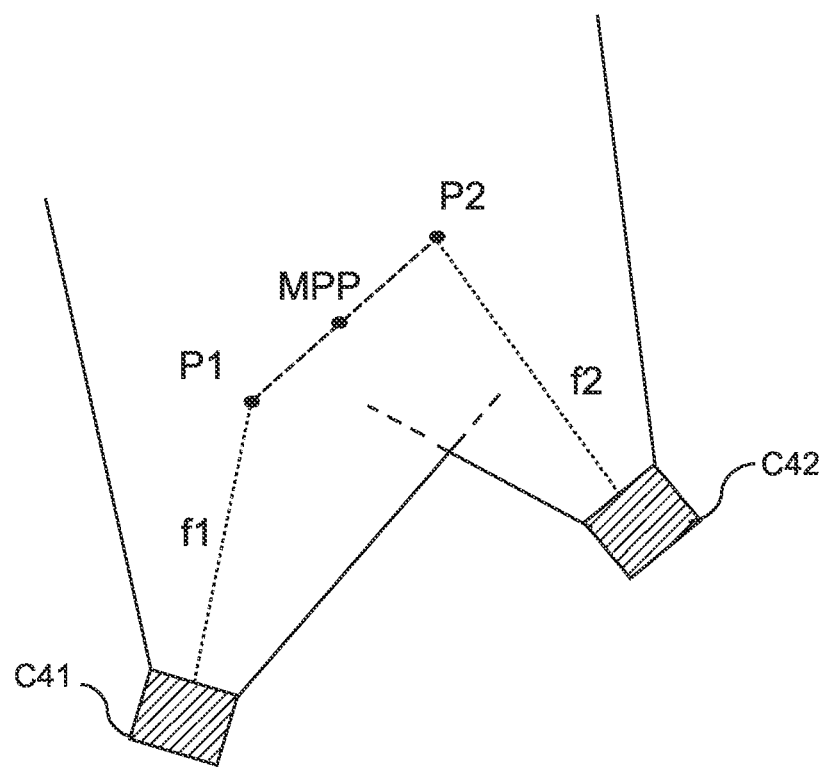
FIG. 4 shows schematically an example of the principal points associated with a pair of cameras.

The method may comprise determining the mid-point between the principal points for each camera pair that provides coverage of a given sub-unit. FIG. 4 shows an example of the principal points associated with each camera in a camera pair. In FIG. 4, a first camera C41 is shown as having a focal length, f1, and principal point, P1; a second camera C42 is shown as having a focal length, f2, and principal point, P2. The midpoint between the principal points is indicated as midpoint MPP. The midpoint between principal points provides a further indication of the degree of overlap between images. The epipolar diagonal may give the depth coverage and the principal point midpoints may give the depth accuracy from minimizing distortion.

For each camera pair providing coverage of a given sub-unit, a weighting may be determined for that camera pair, with the weighting being dependent on the epipolar diagonal and principal midpoint associated with the camera pair. The weighting may be proportional to the epipolar diagonal and inversely proportional to the midpoint between principal points of the camera pair. That is, the larger the epipolar diagonal associated with a given camera pair, and the smaller the distance between the principal points, the larger the weighting associated with that camera pair. A larger weighting indicates that more depth information can be obtained for the given sub-volume of the space, by the corresponding camera pair.

As will be appreciated, the direction that each camera is facing relative to the sub-unit will also need to be considered. For example, it may be that only some of the faces of a given sub-unit are facing towards a camera pair, and so it may only be possible to obtain depth data for the parts of the scene within the voxel that are aligned in the same direction. Thus, it may be useful to encode a directionality associated with each camera pair, relative to the one or more sub-units that are within the field of view of that camera pair. Hence, the method may further comprise determining, for each camera pair, a directionality associated with the overall (e.g. averaged) pose of that camera pair. This directionality may be determined relative to one or more surfaces making up the sub-unit. An example of this is shown schematically in FIG. 5.

Figure 5:
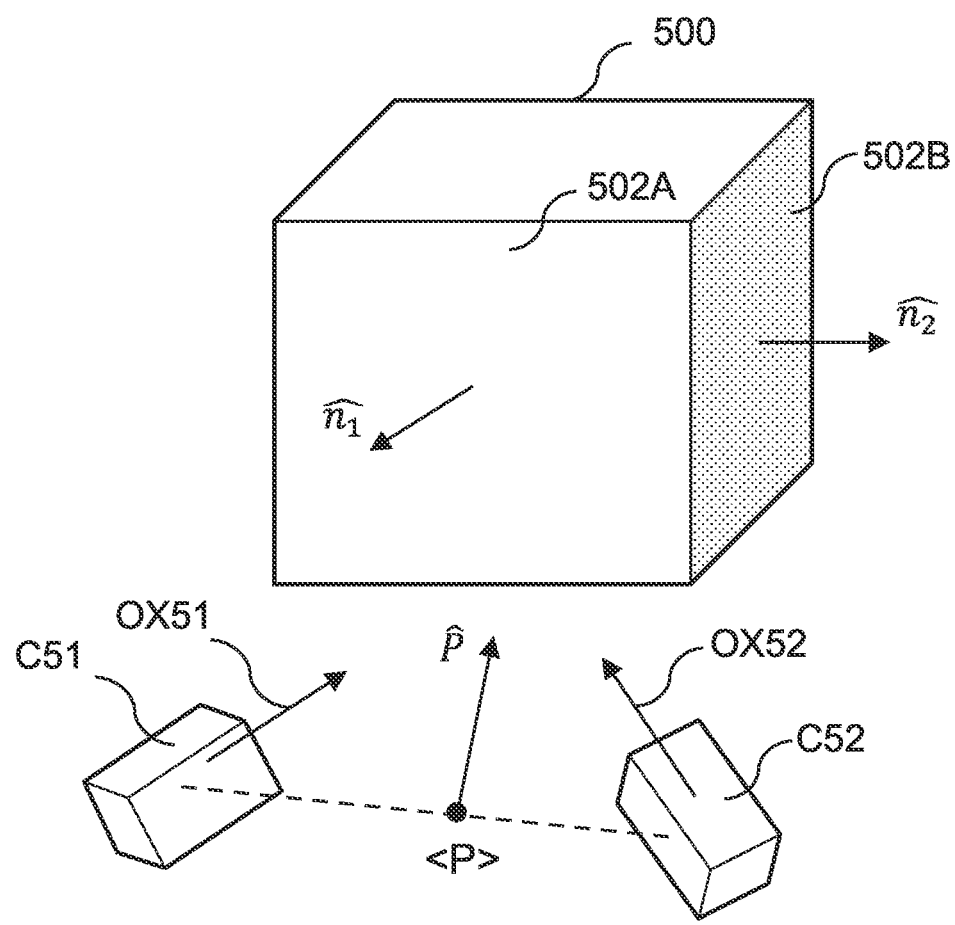
FIG. 5 shows schematically an example of a voxel and the averaged pose of a camera pair relative to the voxel.

FIG. 5 shows schematically an example of a voxel 500 forming part of the volume enclosing the capture area. In FIG. 5, the voxel 500 corresponds to a cuboid having six faces, with the surface normals, $\hat{n}_1$, $\hat{n}_2$, shown for two of the faces (corresponding to the front 502A and right 502B faces). Two cameras C51 and C52 are shown with each camera being oriented (at least partially) towards the front face of the voxel. The averaged pose of the camera pair is shown as having position <P> and being pointed in direction $\hat{P}$. In FIG. 5, the direction in which each camera is pointed is shown via the corresponding optical axes OX51 and OX52.

In FIG. 5, it can be seen that the averaged pose of the camera pair is pointed towards the front face 502A of the voxel. Generally, the closer the averaged pose is to being pointed in a direction that is opposite (i.e. antiparallel) to the surface normal of the front face, the more suitable that camera pair is for obtaining depth data for parts of the scene that are front facing. The further the averaged pose deviates from being antiparallel with the surface normal $\hat{n}_1$, the less suitable that camera pair is for reconstructing parts of the front-facing parts of the scene.

For each camera pair, and at least one surface normal of the voxel, it may be determined which, if any camera pairs, are better positioned for obtaining depth data from a respective direction with respect to that surface normal. This may involve determining, for each surface normal, a camera pair having the highest weighting associated therewith (based on the epipolar diagonal and principal points midpoint) and that has an averaged pose that is closest to being antiparallel to the surface normal.

In the example shown in FIG. 5, this may involve determining for each face of the voxel, a corresponding camera pair having the highest weighting (determined as above) and that is closest to being pointed directly at that face (determined as above). This camera pair may be identified as the camera pair that is suitable for obtaining depth data for the voxel, for that specific surface of the voxel. It may be that each voxel is associated with six camera pairs, with each camera pair corresponding to a different respective face (i.e. surface normal direction) of the voxel. Each camera pair may be associated with a camera pair identifier that enables that camera pair to be identified.

In some examples, a camera pair may be assigned a weighting that is dependent on the epipolar diagonal, principal point midpoint and direction associated with that camera pair. For example, each voxel surface may be associated with a list of camera pairs and respective weightings, with the weightings for the camera pairs not oriented (on average) towards the voxel surface having lower weightings relative to the camera pairs that are oriented (on average) to the voxel surface. Alternatively, it may be that the weighting is just dependent on the epipolar diagonal and principal point midpoint, and that a camera pair is simply not assigned to a given voxel surface if it is determined that the camera pair is not oriented towards that voxel surface.

Figures 6, 7:
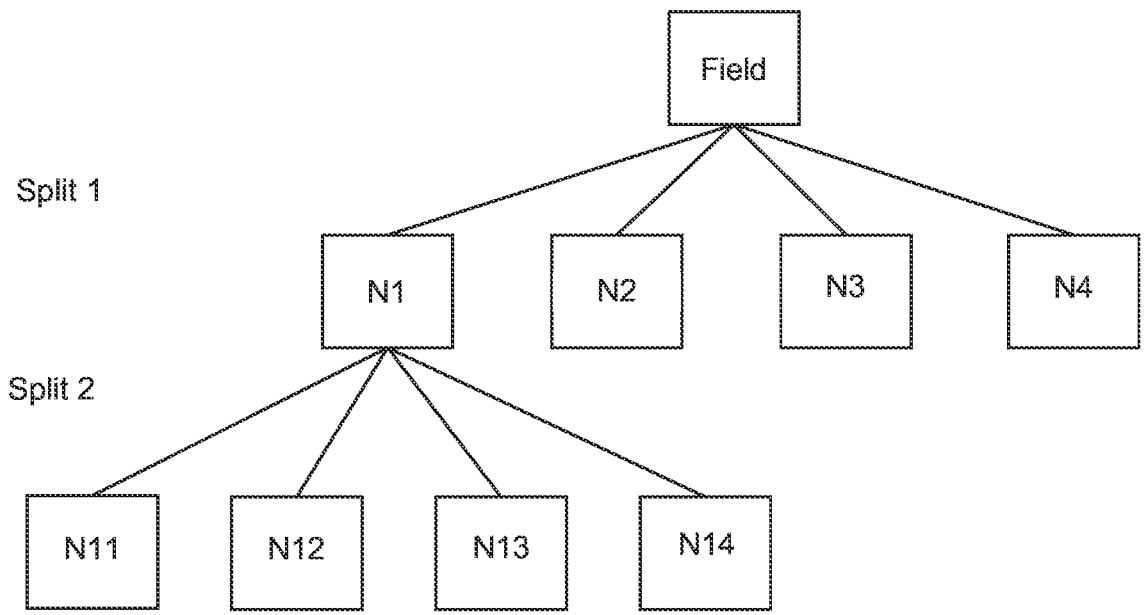
FIG. 6 shows schematically an example of a look-up table corresponding to a voxel representation of a scene.
FIG. 7 shows schematically an example of an octree representing the scene.

Each voxel as defined in the data structure may correspond to an index in a look-up table (LUT). An example of such a look-up table is shown in FIG. 6, as LUT 600. In FIG. 6, a first column 601 is shown as defining indexes. These indexes may correspond to voxels, e.g. index 1 a first voxel, index 2 a second voxel, and so on and so forth. Each voxel may be associated with six entries, each entry corresponding to a different face of the voxel. For example, in FIG. 6, F1 may correspond to a front face of a voxel, F2 to a left face, F3 to a right face and so on and so forth. Each entry may indicate one or more camera pairs that are suitable for reconstructing depth information within the voxel, with respect to the corresponding face of the voxel. That is, each face may be associated with a camera pair identifier, indicating which (if any) camera pair is oriented towards that face, and can be used for obtaining depth data for corresponding parts of the scene that are facing in the same direction (e.g. front, right, left, back, top, bottom).

As will be appreciated, depending on the set-up of cameras, it may be that there are no camera pairs suitable for obtaining depth data for a given surface of the voxel, and so it may be that only some of the faces of the voxel are associated with a corresponding camera pair. An example of this is shown in FIG. 5, where it can be seen that there is no camera pair indicated for index 2, F1 (i.e. '0').

The look-up table may include further entries, such as e.g. for each face of each voxel, the extrinsics, principal points, principal point midpoint, epipolar diagonal, averaged pose associated with the camera pair identified as being suited for obtaining depth data for that surface.

In some examples, each voxel may be further associated with one or more weightings, indicating the suitability of each camera pair for obtaining depth data for that voxel, for a given direction. For example, it may be that the LUT provides for each face of each voxel, the camera pairs providing depth coverage of that voxel face, and the weightings associated with those camera pairs. The weightings may be determined as described above. In such examples, it may be that the most appropriate camera pair for obtaining depth data for a given face of a given voxel is determined by identifying the camera pair associated with highest weighting. That is, the optimally positioned camera need not be explicitly indicated in the table but can be identified based on a corresponding weighting.

The above-described step of determining which, if any, of the camera pairs are suited for obtaining depth data from a respective direction may be repeated for each voxel forming the capture volume. This may involve iterating through the steps of determining a weighting associated with each camera pair, and an averaged pose of that camera pair relative to one or more surface normals of each voxel (e.g. each face).

Returning to FIG. 3, it can be seen that the capture volume has been divided into 36 equal-sized voxels. A first voxel 303, shown in black, may correspond to the voxel shown in FIG. 5. In the example of FIG. 3 it may be that the look-up table corresponds to a table having 36 indexes, with each index corresponding to a different voxel in the capture volume. Each index may be associated with six entries, each entry defining a camera pair that is suited for obtaining depth data from a different respective direction. Using this look-up table, it can then be determined, for a given pose of a virtual camera, which of the voxels will be within the frustum of the virtual camera, and which camera pairs should be used for reconstructing the parts of the scene within those voxels.

Dividing the Capture Volume

In FIG. 3, the capture volume is shown as being subdivided uniformly, with each voxel occupying the same volume of space. This corresponds to a relatively arbitrary division of the capture volume. In some examples, it may be that the capture volume is divided up differently, and not necessarily in a uniform manner.

In some examples, the capture volume may be divided in a hierarchical manner, based on the depth coverage associated with the camera pairs positioned around the scene. In the present disclosure, a pair of cameras are said to provide depth coverage of a part of scene if depth data can be extracted for that part of the scene, from the images captured by the cameras in the corresponding camera pair. In essence, 'depth coverage' is equivalent to the field of view of a depth camera that a given pair of cameras corresponds to. The depth resolution of a camera pair corresponds to the amount of depth data that can be obtained for a given volume of space. For example, the depth resolution of a first camera pair may be said to be higher than a second camera pair, if the first camera pair is able to obtain more depth data for the same volume of space.

Figure 8:
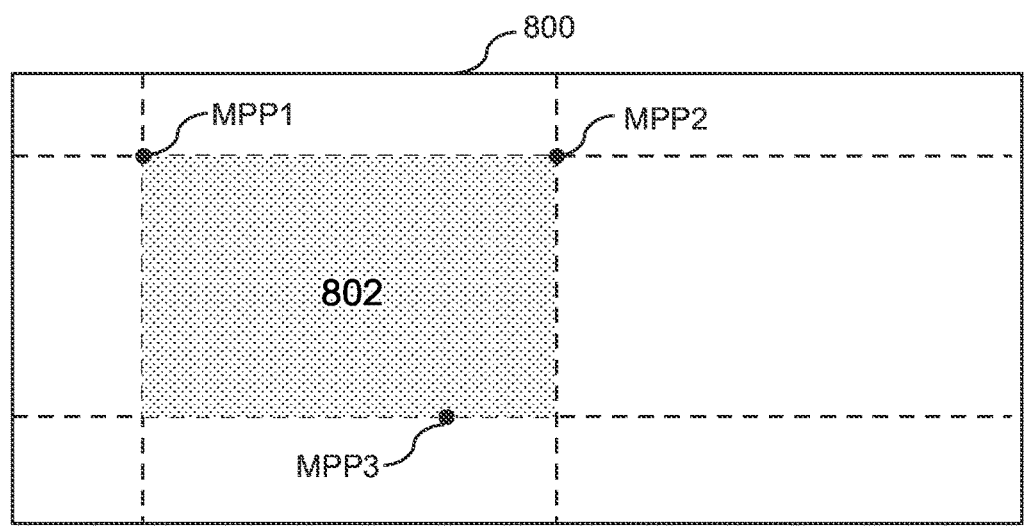
FIG. 8 shows schematically an example of a capture volume divided into voxels in accordance with a kd-tree.

In some examples, the capture volume, as divided into voxels, may be represented as a hierarchal data structure. Each successive layer in the hierarchical data structure may correspond to a further sub-division of the capture volume. An example of this is shown in FIG. 7, where the node at the top of the structure corresponds to the entire capture volume, e.g. the volume enclosing a football field. The capture volume is then split into a second layer of nodes, with each node corresponding to a respective voxel of the capture volume. For example, the nodes N1, N2, N3, N4 may correspond to different quadrants of the capture volume. Each node may then be split again, depending on the granularity with which the voxel space has been divided up. In FIG. 8, the node N1 is shown as being further divided into quadrants. For each node (regardless of layer), one or more camera pairs providing depth coverage from a given direction (e.g. front, back, top, bottom, left, right) may be indicated. In some examples, one or more of the extrinsics, principal points, principal points midpoint, epipolar diagonal and averaged pose may be further defined for each of the camera pairs identified for a given voxel and direction associated therewith.

In some examples, each voxel (and sub-voxel) is subdivided based on a determination that there is a sub-volume within a given voxel for which a different camera pair provides depth coverage (from a respective direction) at a higher resolution. The depth coverage may be a higher resolution in the sense that there is more depth data that can be obtained within the sub-voxel, compared with the camera pair providing depth coverage of the coarser parent voxel. In such examples, at least one surface of each voxel (and sub-voxel) may be associated with a corresponding camera pair identifier, indicating the camera pair that is able to obtain depth data for that surface at the highest depth resolution relative to the other camera pairs providing depth coverage of that surface.

Hence, in some examples, the number and size of the voxels of the voxel representation may be indicative of the depth resolution available from a current camera set-up. For example, a large number of small voxels may indicate that a high depth resolution is available for each voxel (or at least some of the corresponding voxel surfaces); whereas, a few large voxels may be indicative that only a low depth resolution is available for each voxel (or at least some of the corresponding voxel surfaces). A few large voxels being defined in the data structure may occur where e.g. there is a sparse distribution of cameras positioned around the scene. In this way, the data structure acts as a heat map of depth coverage and depth resolution, enabling a user (e.g. camera operator) to determine whether the extrinsics and/or intrinsics of one or more cameras should be adjusted.

It will be appreciated that, in some examples, the voxels may be sub-divided in a non-uniform manner. For example, some voxels may be sub-divided further than others, depending on the depth coverage (and corresponding depth resolution) associated with those voxels.

In some examples, the hierarchical data structure may correspond to an octree, with at least some of the voxels in the data structure being sub-divided into octants. Each octant defined in the octree may correspond to a volume of space for which a given camera pair has been identified as providing depth coverage (and optionally, at a higher depth resolution relative to the other camera pairs providing depth coverage of the parent voxel).

In some examples, it may be determined, for a given voxel, whether the distance between the principal points for a given camera pair providing depth coverage of that voxel is less than a dimension (e.g. width) of the voxel. If the distance between the principal points is less than this, the voxel may be sub-divided further. The steps of determining a weighting for each camera pair, and an averaged pose of each camera relative to a surface normal of the voxel may then be repeated for the sub-divided voxel. That is, the pre-computation stage may be iterative, being performed each voxel and each sub-division thereof.

In some examples, the capture volume may be divided into voxels according to the midpoints between the principal points of each camera pair. This may be achieved using a k-dimensional tree (kd-tree), for example. An example of this is shown in FIG. 8, which shows a top down view of the capture area 800, where a voxel 802 is shown as being formed of the planes defined by the midpoints MPP1, MPP2, MPP3 between principal points (not shown) of different respective camera pairs. In some examples voxel 802 may be further sub-divided based on midpoints falling within this voxel. Again, for each voxel and sub-division thereof, the camera pairs suitable for reconstructing a given surface of the voxel may be determined as above. In FIG. 8, voxel 802 may correspond to a volume of space for which depth data can be obtained by the camera pairs corresponding to midpoints MPP1, MPP2 and MPP3.

Figure 9:
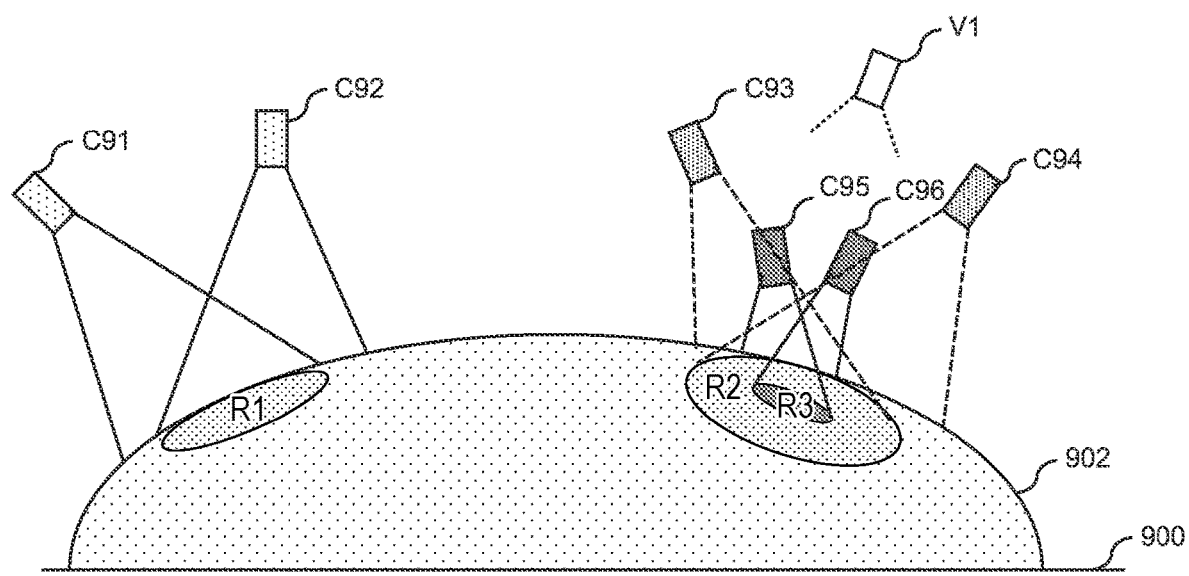
FIG. 9 shows schematically an example of a hemispherical voxel representation of the scene.

As mentioned above, the capture volume need not be divided up in a uniform manner. FIG. 9 shows schematically another example of how the capture volume may be divided based on the depth coverage of camera pairs located about the scene. In FIG. 9, the capture area 900 is shown as being encapsulated by a hemisphere 902. A plurality of cameras C91, C92, C93, C94, C95 and C96 are shown positioned around the scene. In FIG. 9, the cameras are shown as being positioned above and oriented towards the hemisphere. It will be appreciated that this just an example of a camera configuration, and that, depending on the type of event being captured, the cameras may be arranged differently.

In FIG. 9, the first camera pair comprises C91 and C92; the second camera pair comprises C93 and C94; the third camera pair comprises C95 and C96. It will be appreciated that other possible combinations of camera pairs are possible, but for clarity, only three will be described in relation to FIG. 9.

In FIG. 9, each camera pair is associated with a respective region corresponding to the depth coverage provided by that camera pair. In FIG. 9, the first, second and third camera pairs are shown as having associated depth coverages R1, R2 and R3, respectively. The depth coverages are shown as two-dimensional projections on the surface of the hemisphere. The centre of each region may correspond to the midpoint of the principal points associated with the corresponding camera pair. Although not shown, it will be appreciated that, in some examples (depending on the extrinsics and/or intrinsics of the cameras), the depth coverage may correspond to a volume that is located partially or entirely within the hemisphere.

In FIG. 9, the depth coverage provided by cameras C95 and C96 (region R3) is shown as a darker region R3 relative to the other regions. In FIG. 9, the darker region R3 indicates that a higher quality reconstruction of the scene is possible for this region, relative to the other regions (R1 and R2). In the example shown, this is because cameras C95 and C96 are located closer to that part of the scene (although the same effect may be obtained by having a larger focal length) and can therefore obtain more image detail from the captured images. Conversely, cameras C93 and C94 are located further away (and may have e.g. a smaller focal length) and so are able to obtain less image detail for the part of the scene corresponding to region R3. As a result, cameras C95 and C96 can obtain more depth detail for the part of the scene within region R3 (i.e. are of a higher depth resolution).

Hence, when reconstructing the scene, it may be desirable to ensure that cameras C95 and C96 are used for reconstructing the part of the scene within region R3, and that cameras C93 and C94 are used for reconstructing the remainder of region R2. Although not shown, in FIG. 9, it may be that e.g. cameras C93 and C95 provide depth coverage for an intermediate region between regions R3 and R2, and that a higher quality reconstruction can be obtained for the intermediate region using those cameras.

As will be appreciated, the desired level of depth detail will depend on the viewpoint from which the scene is to be reconstructed. For example, if a virtual camera is positioned relatively far from a region of interest and/or has a small focal length (i.e. wide angle view), then it may be sufficient to use cameras C93 and C94 for reconstructing the corresponding part of the scene. An example of this is shown in FIG. 9, where a virtual camera V1 is shown as being located between above and between cameras C93 and C94. In FIG. 9, the field of view of the virtual camera is truncated, to avoid cluttering the diagram.

In the example of FIG. 9, the capture volume (i.e. a hemisphere) may be divided into voxels via one or more spherical harmonic functions. Higher-order spherical harmonic functions may be used to represent finer granularity volumes of space. For example, in FIG. 9, a first voxel may cover a region R2, which may be sub-divided into a further voxel covering region R3. A higher order spherical harmonic function may be used for representing the region R3. The data structure may still be hierarchical in that for at least some voxels, there are one or more successive layers of sub-voxels representing finger granularity volumes of space. Each voxel may be associated with a surface normal, such that, for a given pose of a virtual camera, it can be determined whether (or to what extent) the virtual camera is oriented towards that voxel.

While the above embodiments have been described in relation to cuboidal and hemispherical volumes divided into voxels, it will be appreciated that the capture volume may be enclosed by any 3D shape. Moreover, the voxels may be of any 3D shape and need not necessarily all be the same shape or uniform in size. Regardless of size and shape, in some examples, each voxel corresponds to a volume of space for which at least one camera pair provides depth coverage of that voxel, from a given direction. As will be appreciated, it may be beneficial to divide the capture volume using relatively simple and uniform voxels, as these will generally be easier to define in the data structure. However, more complex shaped voxels may allow for more directions to be considered when determining which camera pairs are best suited for the surfaces making up those voxels. More complex shaped voxels may also allow voxel surfaces to be defined that are more closely oriented towards a given camera pair's overall optical axis.

Figure 10:
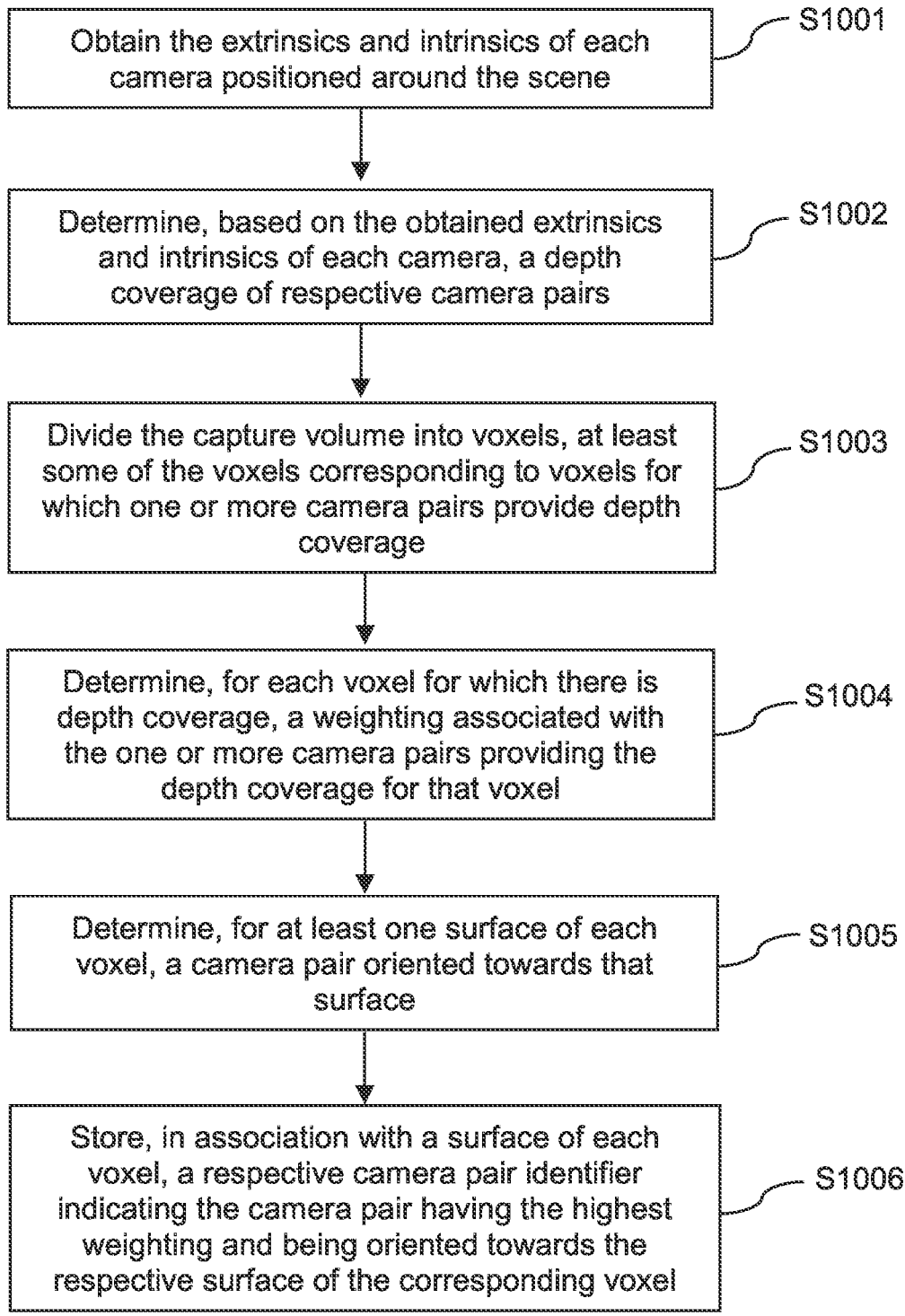
FIG. 10 illustrates an example of a method for generating a voxel representation of the scene in accordance with the present disclosure.

FIG. 10 shows an example of a high-level method for generating the above-described data structure.

At a first step S1001, the extrinsics and intrinsics of each camera positioned around the scene is obtained. The extrinsics and intrinsics may be obtained via known photogrammetry techniques, e.g. via chessboard detection. In some examples, each camera is pre-calibrated and so the intrinsics and extrinsics are known in advance of the content capture. The extrinsics and/or intrinsics of each camera may be tracked, such that the data structure is updated in response to such changes.

At a second step S1002, a depth coverage of respective camera pairs is determined based on the extrinsics and intrinsics of each camera. As described previously, the depth coverage for a given camera pair corresponds to the field of view for which depth data can be obtained from images captured by the cameras in that camera pair. The depth coverage may be determined by generating a map of overlapping camera frustums for each camera pair, as described previously.

At a third step S1003, the capture volume is divided into a plurality of voxels. In some examples, the volume is divided based on the determined depth coverage, such that at least some of the voxels correspond to voxels for which at least one camera pair provides depth coverage. As will be appreciated, it may be useful to indicate which volumes of space are associated with a poor depth coverage, and so not all of the voxels may be associated with a camera pair providing depth coverage of that voxel.

In some examples, the capture volume may be divided such that each voxel corresponds to a volume of space that is within the shared field of view of at least one camera pair. In such examples, the ability to divide the volume in this way will depend on the configuration and/or number of cameras positioned about the scene.

At a fourth step S1004, a weighting is determined for each pair of cameras providing depth coverage of a respective voxel. That is, for each voxel, a weighting associated with the one or more camera pairs providing the depth coverage for that voxel is determined. The weighting is determined based on at least one of the epipolar diagonal and principal points associated with the cameras in the corresponding camera pair. The weighting may be determined as described previously in relation to FIGS. 2 to 4. A higher weighting may be indicative that a higher quality reconstruction can be obtained from the cameras in the corresponding camera pair, relative to the cameras providing depth coverage of a given voxel.

At a fifth step S1005, it is determined, for at least one surface of each voxel, whether a camera pair providing coverage of that voxel is oriented towards the voxel surface. In some examples, step S1005 may comprise determining, for each face of each voxel, whether a corresponding camera pair is oriented towards that face. As described previously (in relation to FIG. 5), this may involve determining an averaged pose of the respective camera pair(s) providing depth coverage of a given voxel, and determining whether the averaged pose corresponds to a direction that is oriented towards one of the surfaces of the voxel. This may be repeated for each surface of each voxel.

At a sixth step S1006, it is determined which of the camera pairs oriented towards a given surface of a voxel (and providing depth coverage thereof) has the highest associated weighting. This step is repeated for each surface of each voxel for which a corresponding camera pair is oriented and provides depth coverage.

As mentioned previously, in some examples, the weighting assigned to a camera pair may also be dependent on the averaged pose. This may be the case where e.g. all camera pairs are assigned to a given voxel surface.

Step S1006 further comprises storing, in association with a surface of each voxel, a respective camera pair identifier indicating the camera pair having the highest weighting and being oriented towards the surface of the corresponding voxel. In some examples, it may be that a given voxel surface only has one camera pair oriented towards it and so there is no step of determining which camera pair is associated with the highest weighting.

In accordance with the above-described method, the data structure defines a plurality of voxels and a corresponding camera pair identifier for at least some of the surfaces of the voxels. The camera pair identifier indicates which camera pair is suitable for obtaining depth data for that voxel, for a respective direction. The data structure may provide an indication of the percentage of the capture volume that can be reconstructed in 3D, based on the number of voxels (and associated surfaces) for which one or more camera pairs provide depth coverage.

Moreover, the data structure may provide an indication of the quality with which parts of the scene can be reconstructed in 3D, based on e.g. the weightings associated with camera pairs providing depth coverage of the voxels. In examples where the capture volume is divided based on the depth coverage, the granularity with which the volume has been divided may provide a further indication of the quality of the reconstruction that can be obtained for different parts of the scene. For example, smaller voxels may be indicative of higher obtainable depth resolutions.

Ultimately, the generated data structure allows the depth coverage of different voxels, for different respective directions, to be determined. For a given voxel, and direction relative to that voxel, a corresponding pair of cameras can be identified for reconstructing the part of the scene for that direction. As a result, there is no longer a need to iterate over every camera pair when reconstructing the scene or a region of interest within the scene. In turn, less time is wasted processing images for which no or sub-optimal depth data can be extracted.

Run-Time Usage

Having divided the capture volume into voxels, it can then be determined, based on the extrinsics and/or intrinsics of a virtual camera, which, if any, of the cameras (i.e. real cameras) positioned around the scene can be used for reconstructing the parts of the scene within the virtual camera's field of view. This may involve, for example, determining, based on the extrinsics and intrinsics of the virtual camera, which of the voxels fall within the field of view of the virtual camera. It may then be determined, for these voxels, which faces of those voxels are facing towards the virtual camera. A face of a given voxel may be said to be facing towards the virtual camera if at least some of that face is within the field of view of the virtual camera, i.e. is not occluded by more than a threshold amount.

As described above, in some examples, the capture volume may be divided in a hierarchical manner (and defined by a corresponding hierarchical data structure). In such examples, it may not be necessary to iterate over all of the individual sub-voxels falling within the field of view of the virtual camera, when determining which, if any, camera pairs can be used for reconstructing the corresponding parts of the scene. For example, if the virtual camera is positioned relatively far from the capture volume and/or has a small focal length (e.g. 18 mm or below) then it is unlikely that a high level of detail will be needed when reconstructing the scene from the viewpoint of the virtual camera. In such examples, it may be sufficient to determine, for one or more coarse voxels falling within the field of view of the virtual camera, the corresponding camera pair(s) that is (or are) suited for reconstructing (in 3D) the parts of the scene within the virtual camera's field of view. This may involve, for example, determining which surfaces of the coarse voxels are facing towards the virtual camera. For the surfaces that are facing towards the virtual camera, the corresponding camera pairs associated with those faces may be identified and used to reconstruct the corresponding parts of the scene.

Conversely, in some examples, it may be desirable to iterate over at least some of the sub-voxels of the coarse voxels within the field of view of the virtual camera. This may be the case where, for example, a higher resolution 3D reconstruction is desired. In such examples, generating the 3D reconstruction may involve iterating over the sub-voxels of each coarse voxel identified as being within the field of view of the virtual camera. For each sub-voxel within a given coarse voxel, it may be determined which, if any of faces of the sub-voxel are facing towards the virtual camera, and for the face(s) that are, a corresponding camera pair that is suitable for obtaining depth data for those faces may be determined from the data structure. This may be equivalent to generating a higher quality reconstruction by considering camera pairs that are located closer to the region of interest and/or for which the region of interest occupies a larger portion of the (overlapping) fields of view.

It will be appreciated that a surface of a given voxel need not be pointed directly at the virtual camera (i.e. antiparallel to the optical axis of the virtual camera) in order to be pointed towards it. As noted previously, a surface of a given voxel is said to be pointed towards a virtual camera if at least some of that surface is (or would be) visible in the images captured by the virtual camera. Similarly, a surface of a given voxel is said to be pointed towards a given camera pair if depth data can be obtained for at least some of that surface in the images captured by the camera pair.

As mentioned previously, the data structure may be updated dynamically. For some types of content, such as sports matches, it is typical for non-fixed cameras to be used and/or for the focal length of one or more cameras to be adjusted (e.g. to zoom-in on an event of interest). Hence, the extrinsics and/or intrinsics of one or more camera pairs may vary throughout the capture of the content. The data structure may therefore be updated accordingly, based on the new extrinsics and/or intrinsics of one or more cameras (in the same manners as described previously).

In some examples, the extrinsics and/or intrinsics of each camera positioned around the scene is monitored throughout the capture of the content and provided to a central computing device, which recalculates the data structure. The re-calculated data structure may then be accessed by one or more client devices or pushed to those client devices. The client devices may then use the data structure to request images from the corresponding camera pairs identified as being suitable for generating a reconstruction of the scene from the viewpoint of a virtual camera. The extrinsics and/or intrinsics of the virtual camera may be controllable at the client device, for example. The client device may also allow a user to define a point in time within the content, for which a reconstruction of the scene from the viewpoint of the virtual camera is to be generated. This point in time may be used to identify specific frames from an identified camera pair that are to be used in reconstructing the scene from the viewpoint of the virtual camera.

In some examples, the generated data structure may be used to control the extrinsics and/or intrinsics of a virtual camera. As described previously, the data structure provides an indication of the parts of the scene for which depth data can be obtained, and the quality (i.e. resolution) of the depth data that can be obtained for those parts. Hence, the data structure may be used to determine a pose of (or path that is to be taken by) a virtual camera, such that a reconstruction of the scene is only attempted for viewpoints for which a reconstruction is possible and will be of an acceptable resolution (i.e. exceeds a threshold resolution). This may involve determining, for a given direction, which voxels can be reconstructed in 3D, and positioning (and/or adjusting the intrinsics of) the virtual camera to ensure that those voxels are within the field of view of the virtual camera.

Where spherical harmonics are used, the spherical harmonic data may encode areas of depth resolution. Converting this to the Cartesian coordinates of the virtual camera allows the data structure to be used like a heatmap of depth resolution, such that the path of a virtual camera can be confined so as to only capture regions of the scene for which an acceptable (i.e. within a threshold) depth resolution can be obtained.

As mentioned previously, the data structure may also provide information as to which parts of the scene have no or low quality depth coverage. These parts of the scene may correspond to voxels (or voxel surfaces) having no corresponding camera pair identifier, or for which the weighting associated with the camera pair identifier is less than a threshold value. Hence, in some examples, one or more voxels may be identified as having insufficient depth coverage, and the extrinsics and/or intrinsics of one or more camera pairs may be adjusted until the number of voxels (or voxel surfaces) associated with a given camera pair exceeds a threshold number. Alternatively or in addition, the extrinsics and/or intrinsics of one or more cameras may be adjusted until the weightings associated with one or more camera pairs exceed a threshold value.

In some examples, the adjustment of the extrinsics and/or intrinsics of the one or more is controlled by a central computing device that is in communication with (e.g. via a wired or wireless connection) the one or more cameras positioned around the scene. The central computing device may be configured to obtain the generated data structure, and based thereon, determine a change in the extrinsics and/or intrinsics of one or more cameras that will result in an improved depth coverage of the scene. The central computing device may be configured to transmit an indication of the updated extrinsics and/or intrinsics of one or more cameras to the corresponding cameras.

In some examples, it may be that a reconstruction of an object of interest within the scene, from a given direction, is desired. For example, it may be desirable to generate a face-on 3D reconstruction of a player in a sports match, with the player being recognisable in the reconstruction based on their facial features. In order to generate such a reconstruction, the pose of the player relative to one or more voxels defined in the data structure may be determined. This may involve determining which (if any) of the voxels the player is within, and how the player is oriented relative to those voxels. It may be determined for example, which (if any) faces of a given voxel the player's face is oriented towards. For the voxel faces that the player's face is oriented towards, the corresponding camera pair identifiers may be identified in the data structure. If there are no corresponding camera pair identifiers associated with those voxel surfaces, then the extrinsics and/or intrinsics of the one or more cameras may be adjusted, until adequate depth coverage of those voxel faces is provided.

Figure 11:
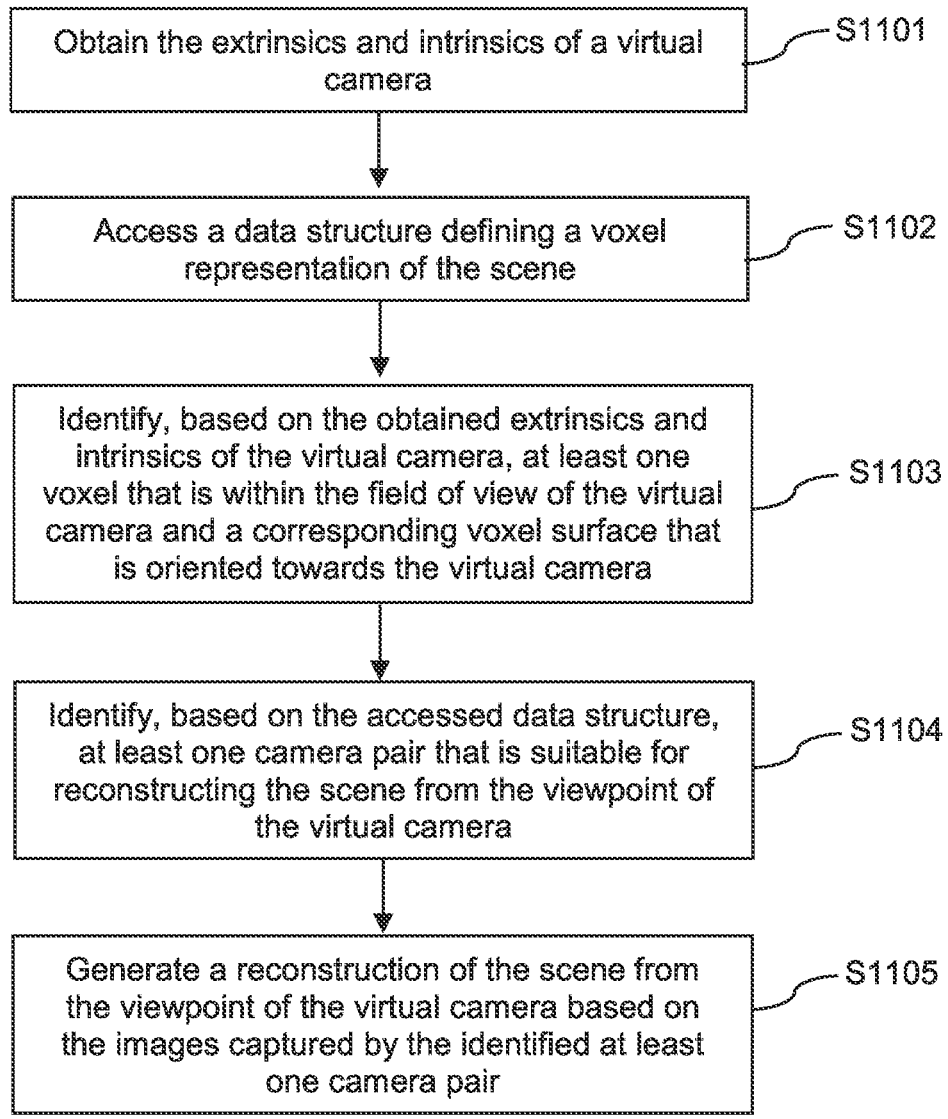
FIG. 11 illustrates an example of a method for generating a reconstruction of a scene from the viewpoint of a virtual camera, in accordance with the present disclosure.

FIG. 11 illustrates a high-level example of a method for generating a reconstruction of a scene in accordance with the present disclosure.

At a first step S1101, the extrinsics and intrinsics of a virtual camera is obtained.

At a second step S1102, a data structure is accessed so as to determine at least one camera pair that is to be used in reconstructing the scene from the viewpoint of the virtual camera. The data structure may be generated, and correspond to, any of the previously described data structures. The data structure defines a voxel representation of the scene. For each voxel in the voxel representation, at least some of the voxel surfaces are associated with respective camera pair identifiers. Each camera pair identifier associated with a respective voxel surface corresponds to a camera pair that has been identified as being suitable for obtaining depth data for the part of the scene within that voxel and for which the averaged pose of the camera pair is oriented towards the voxel surface.

At a third step S1103, at least one voxel that is within the field of view of the virtual camera and a corresponding voxel surface that is oriented towards the virtual camera, is identified based on the obtained extrinsics and intrinsics of the virtual camera.

At a fourth step S1104, at least one camera pair that is suitable for reconstructing the scene from the viewpoint of the virtual camera is identified, based on the accessed data structure.

At a fifth step S1105, a reconstruction of the scene from the viewpoint of the virtual camera is generated based on the images captured by the cameras in the identified at least one camera pair.

Figure 12:
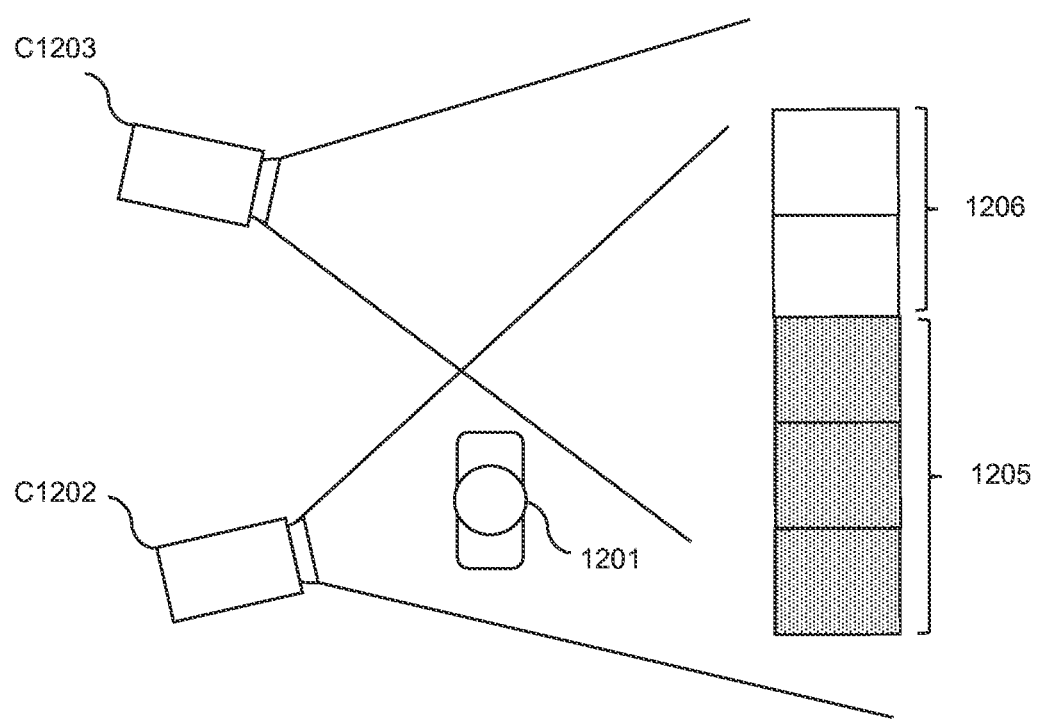
FIG. 12 shows schematically an example of a scene in which one or more voxels representing the scene are occluded by an object.

In some examples, it may be that part of the scene is occluded by one or more objects. An example of this is shown in FIG. 12, where it can be seen that an object 1201 is positioned in front of camera C1202. The object may correspond to e.g. a football player that has stood in front of one camera, but where a reconstruction of a more distant player is desired.

In FIG. 12, the corresponding voxels for which a reconstruction is no longer possible using the images captured by cameras C1202 and C1203 are shown as voxel group 1205 (shaded). In FIG. 12, the non-occluded voxels are shown as voxel group 1206. In some examples, the data structure may be updated in response to at least some of the voxels being detected as occluded by an object. This occlusion may be detected based on a detected location and size of an object relative to the cameras positioned around the scene (which may be detected from the images captured by the calibrated cameras). In some examples, the voxels that are occluded (e.g. voxel group 1206) may be removed from the data structure.

Alternatively or in addition, the data structure may be adjusted by identifying, for the occluded voxels, any camera pair identifiers that correspond with the camera for which part of the scene is now occluded. These camera pairs may then be filtered from the data structure, such that for a given occluded voxel surface, only those camera pairs for which the voxel surface is not occluded are defined (or given a non-zero or higher weighting) in relation to that voxel surface.

In this way, a different camera pair may be identified as being suitable for reconstructing part of the scene for a given direction. The different camera pair may correspond to a camera pair that had the second highest weighting in relation to a given voxel surface, for example. As will be appreciated, if, for a given voxel surface, it is determined that the surface is no longer occluded for a given camera pair, that camera pair may be re-assigned to the voxel surface. Alternatively, it may be that a weighting associated with the camera pair is increased relative to a previous decreasing of the weighting (said decreasing occurring in response to the detected occlusion). Hence, there may be a dynamic 'filtering' of the camera pair weightings, or association of camera pair identifiers, with a given voxel surface in response to a detected occlusion of that voxel surface for a given camera pair.

FIG. 12 is a relatively simple example in that only a single camera pair is shown as providing depth coverage of the scene. In some examples, it may be that further camera pairs provide depth coverage of at least some of the surfaces of the occluded voxels. For example, in a variation of FIG. 12, it may be that only the front faces of the shaded voxels are occluded, and that other camera pairs provide depth coverage for the top, bottom, left, right and back surfaces of the shaded voxels. In such an example, it may be that any camera pair identifiers corresponding to camera C1202 are removed from entries in the data structure corresponding to the front faces of the occluded voxels 1205.

Free-Viewpoint System

Figure 13:
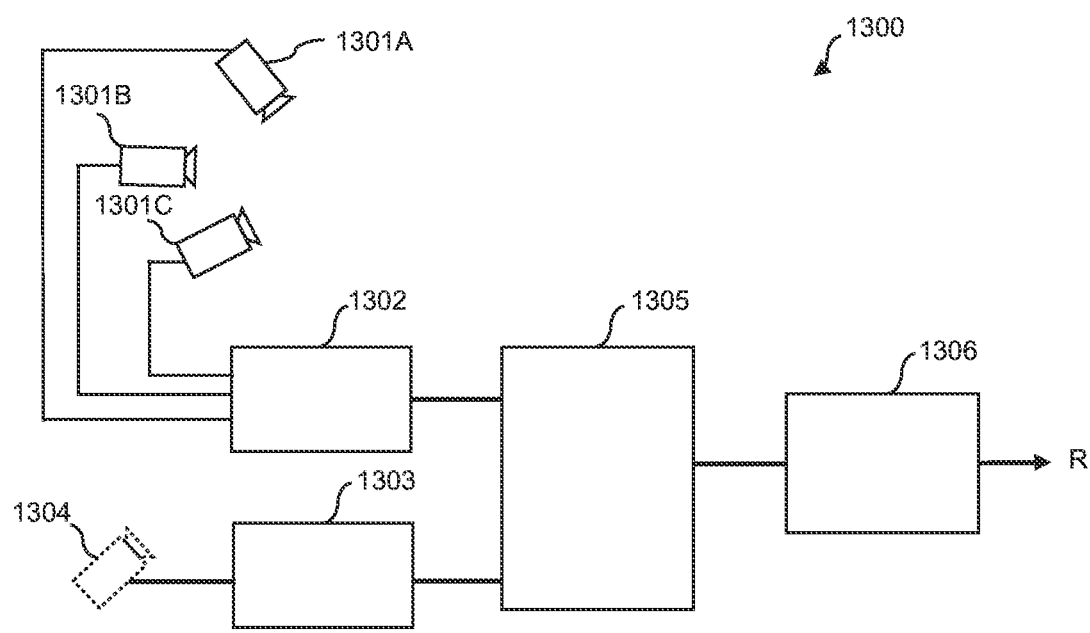
FIG. 13 shows schematically an example of a free-viewpoint system for generating a reconstruction of a scene in accordance with the present disclosure.

FIG. 13 shows schematically an example of a free-viewpoint system 1300 for generating a reconstruction of a scene in accordance with the present disclosure. In FIG. 13, the system 1300 is shown as comprising a plurality of cameras 1301A, 1301B, 1301C; a scene unit 1302; a virtual camera unit 1303; virtual camera 1304; a mapping unit 1304 and image generator 1305.

The scene unit 1302 is configured to obtain the intrinsics and extrinsics of the cameras arranged to capture the scene and based thereon, generate a voxel representation of the scene. The scene unit 1302 may be in communication with the plurality of cameras and receive the intrinsics and extrinsics from the cameras, for example via a wired or wireless connection. The voxel representation comprises a plurality of voxels and defines for at least some surfaces of the voxels, respective camera pairs that have been identified as being oriented towards those voxel surfaces and that are suitable for obtaining depth data for those voxel surfaces. In some examples, the voxel representation defines, for each camera pair identifier associated with a respective voxel surface, a corresponding weighting indicating the resolution of depth data that can be obtained by the corresponding camera pair.

In some examples, the voxel representation corresponds to a hierarchical data structure, wherein each successive layer of the hierarchical data structure corresponds to a sub-division of a respective voxel. For at least some of the surfaces of the sub-voxels, respective camera pair identifiers are defined for those sub-voxel surfaces. The camera pair identifier(s) associated with a respective sub-voxel surface may be associated with a weighting indicating a resolution of depth data that can be obtained for that camera pair.

The scene unit 1302 is configured to generate the voxel representation of the scene. In some examples, the scene unit 1302 is configured to determine, based on the obtained extrinsics and intrinsics of the cameras, a depth coverage for each respective camera pair having at least partially overlapping fields of view. The scene unit 1302 may be configured to generate the voxel representation by dividing the scene into voxels based on the determined depth coverage. For example, such that each voxel corresponds to a volume of space for which at least one camera pair provides depth coverage. Voxels may be sub-divided further based on different camera pairs providing higher resolution depth data within those voxels (as described previously). The scene unit 1302 may be configured to generate the voxel representation in any of the previously described manners (i.e. in relation to FIGS. 1 to 12).

In some examples, the scene unit 1302 is configured to determine, based on the obtained extrinsics and intrinsics of the cameras, a weighting associated with each camera pair providing depth coverage of a respective voxel. The weighting provides an indication of the depth resolution of the corresponding camera pair. As described previously, the weighting may be determined based on at least one of the epipolar diagonal and principal point midpoints of the camera pair. The scene unit 1302 is also configured to determine a directionality of each camera pair providing depth coverage of a respective voxel, relative to one or more surfaces of that voxel. For each voxel surface, the scene unit 1302 is configured to identify a camera pair that is oriented towards that surface and that has the highest weighting relative to the other camera pairs providing depth coverage of the corresponding voxel, and to assign a corresponding camera pair identifier to that surface.

In some examples, the scene unit 1302 comprises a server that is in communication with the plurality of cameras arranged to capture images of the scene.

The system further comprises a virtual camera unit 1303 operable to obtain the extrinsics and intrinsics of a virtual camera. In FIG. 13, a virtual camera (shown in dashed) 1304 is shown as providing an input to the virtual camera unit 1303. The extrinsics and/or intrinsics of the virtual camera may be under the control of a user. For example, the virtual camera unit 1303 may be located at client device, wherein an application installed thereat allows a user to select a viewpoint from which to view video content from. Alternatively, or in addition, the virtual camera unit 1303 may correspond to software installed at a server, that is configured to determine one or more viewpoints from which a reconstruction of the scene is possible and will be of a sufficient resolution.

The system further comprises a mapping unit 1305 operable to map the extrinsics and intrinsics of the virtual camera to at least one voxel surface defined in the data structure and to identify at least one camera pair suitable for obtaining depth data for that voxel surface based on the corresponding camera pair identifier. In some examples, the mapping unit 1305 is configured to map the extrinsics and intrinsics of the virtual camera to at least one sub-voxel surface and to identify, based on the camera pair identifier associated with that sub-voxel surface, a corresponding camera pair suitable for obtaining depth data for the sub-voxel surface. In FIG. 13, the mapping unit 1305 is shown as receiving inputs from the scene unit and the virtual camera unit; this is so that the mapping unit 1305 can access the voxel representation (i.e. data structure) and identify corresponding voxels that are within the field of view of the virtual camera, and which surfaces of those voxels are oriented towards the virtual camera.

The mapping unit 1305 may be located at e.g. a server, or a client device. In some examples, the mapping unit 1305 may be located at the client device, with the output of the mapping unit 1305 being used by the client device to request images from the server, for the corresponding identified camera pair(s).

The system further comprises an image generator 1306 operable to receive an input from the mapping unit, and in response thereto, obtain images captured by the cameras in the at least one camera pair identified as being suitable for reconstructing the scene from the viewpoint of the virtual camera. The image generator 1306 is configured to generate an image of the scene from the viewpoint of the virtual camera based on the obtained images. In FIG. 13, the image generator 1306 is shown as receiving an input from the mapping unit, corresponding to the identifier camera pair(s). The image generator 1306 may be in communication with the cameras and operable to receive images from the camera pairs identified by the mapping unit 1305. In FIG. 13, the image generator 1306 is shown as providing an output, 'R', corresponding to a reconstruction of the scene from the viewpoint of the virtual camera. As will be appreciated, the intrinsics and/or extrinsics of the selected camera pair(s) may need to be considered when generating the final image, so as to accommodate for any e.g. lens distortion introduced by the cameras.

In some examples, the image generator 1306 may be located at a server, and in communication with the plurality of cameras (i.e. non-virtual cameras). The server may also be in communication with a client device. The image generator 1306 may be configured to receive respective video streams from each camera and generate a reconstruction of the scene from the viewpoint of the virtual camera, based on the camera pairs identified by the mapping unit 1305, and an indication of time within the content for which the reconstruction is to be generated. The indication of time may be provided to the server, from the client device, for example. The reconstruction generated by the server may then be pushed to the client device.

Alternatively, or in addition, the image generator 1306 may be located at the client device, with the client device rendering the reconstruction based on the images received from the cameras in the camera pair(s) identified by the mapping unit. That is, the client device may be in communication with the cameras (or an intermediate device), and configured to receive the images captured by the identified cameras. The client device may then render the reconstruction from the desired viewpoint, based on the images received from the corresponding camera pair(s). As will be appreciated, it may be undesirable for the client device to continuously receive a video stream from each camera. Hence, in some examples, the client device may be configured to request images from the relevant camera pairs, as and when those images are required for generating the reconstruction.

Although not shown, in some examples, the system may comprise a display operable to display images generated by the image generator 1306. The display may correspond to, for example, the display of a head-mountable display (HMD), TV, personal computer, smartphone, laptop, tablet, etc. In examples where the display comprises an HMD, the virtual camera unit 1303 may comprise a pose detector operable to detect a pose of the head-mountable display. The pose of the head-mountable display may correspond to the pose of the virtual camera (the intrinsics may be known or set a default value), and the pose of the HMD may be used by the mapping unit to identify one or more camera pairs for reconstructing the scene for that pose.

Figure 14:
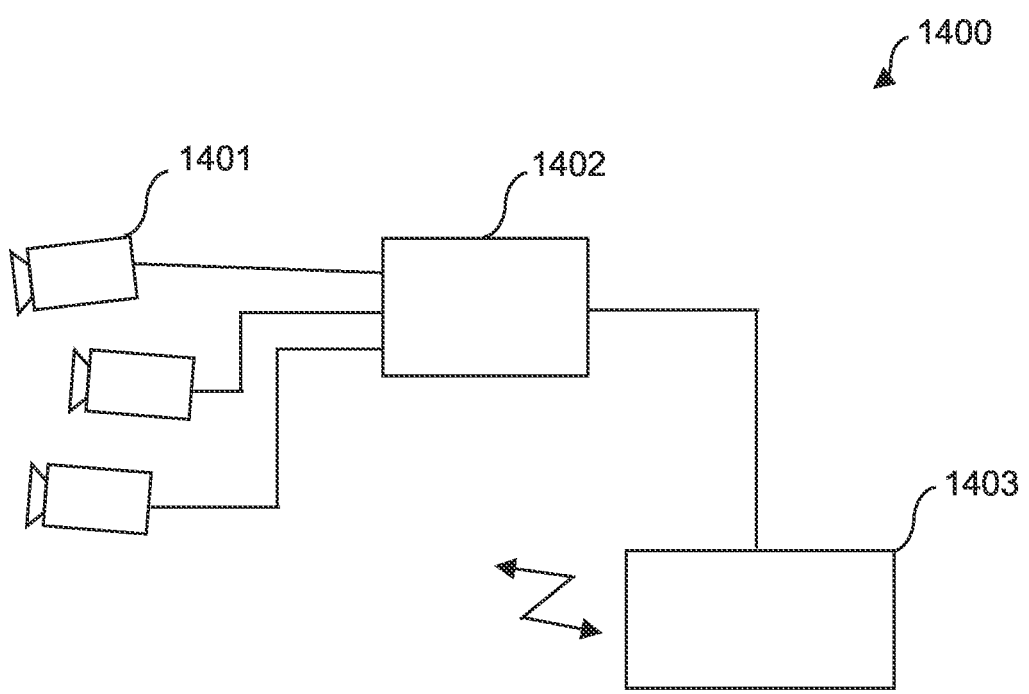
FIG. 14 shows schematically an example of a free-viewpoint system for controlling at least one of the intrinsics and extrinsics of one or more cameras in accordance with the present disclosure.

FIG. 14 shows schematically a further or alternative example of a system 1400 in accordance with the present disclosure. In FIG. 14, the system 1400 comprises a plurality of cameras 1401, a scene unit 1402 and a controller 1403. The scene unit 1402 may correspond to the scene unit described previously in relation to FIG. 13. In FIG. 14, the controller 1403 is shown as being in communication with the cameras 1401 via a wireless connection. It will be appreciated that in some examples, this connection may be a wired connection.

The controller 1403 is operable to communicate with each of the plurality of cameras 1401. The controller 1403 is also configured to receive an input from the scene unit 1402, and in response thereto, determine whether the number of voxel surfaces associated with respective camera pair identifiers exceeds a threshold value. In response to a determination that the number of voxel surfaces associated with respective camera pair identifiers is less than the threshold value, the controller 1403 is configured to adjust the extrinsics and/or intrinsics of one or more cameras 1401 until the number of voxel surfaces associated with respective camera pair identifiers is equal to or exceeds the threshold value. In this way, the controller 1403 is configured to control the extrinsics and/or intrinsics of one or more cameras 1401 so as to improve the overall depth coverage of the scene provided by the respective camera pairs.

As mentioned above, in some examples, the voxel representation defines, for at least some surfaces of the voxels, an indication of the resolution of depth data that can be obtained for the respective camera pair identifiers associated with at least some voxel surfaces. In such examples, the controller 1403 may be configured to adjust the intrinsics and/or extrinsics of one or more cameras 1401, based on a determination that the depth resolution associated with one or more camera pairs is less than a threshold depth resolution. The controller 1403 may be configured to adjust the intrinsics and extrinsics of one or more cameras 1401 until the depth resolution associated with one or more camera pairs is equal to or exceeds the threshold depth resolution.

In some examples, the controller 1403 may be configured to receive an input from the mapping unit, and determine, whether the number of voxel surfaces identified as being within the field of view of the virtual camera and having an associated camera pair identifier, exceeds a threshold value. In response to a determination that the number of voxel surfaces associated with corresponding camera pair identifiers is less than the threshold number, the controller 1404 may adjust the intrinsics and/or extrinsics of one or more cameras 1401, until that number is equal to or exceeds the threshold value.

Furthermore, in examples where each camera pair identifier is associated with a corresponding weighting, the controller 1404 may be configured to determine whether e.g. the average or cumulative sum of the weightings (associated with the identified camera pairs) is less than a threshold value, and in response to determining that the average or cumulative sum is less than the threshold value, adjust the intrinsics and/or extrinsics of one or more cameras. The intrinsics and/or extrinsics of the cameras 1401 may be adjusted until the average or cumulative sum of the weightings associated with the identified camera pairs, is equal to or exceeds the threshold value.

As described previously, in some examples, the voxel representation may be generated based on the determined depth coverage and resolution provided by respective camera pairs. In other words, a larger number of finer grained voxels may be indicative of a higher depth resolution being obtainable for the scene. The controller 1404 may therefore be configured to determine whether the number of voxels and/or the sizes of the voxels exceeds a threshold value. If the number and/or size of the voxels does not exceed this value, this may be indicative that the current arrangement of cameras 1401 provides weak depth coverage of the scene. In response to detecting that the number and/or size of the voxels is equal to or exceeds the threshold value, the controller 1404 may be configured to adjust the intrinsics and/or extrinsics of one or more cameras 1401 until the number and/or size of the voxels exceeds the threshold value.

The extrinsics of the cameras may be controlled remotely. For example, each camera may have an associated rig comprising one or motors, and the controller 1404 may be operable to transmit a signal to the motors, so as to control a position and/or orientation of the respective cameras. Alternatively or in addition, each camera may comprise motion means, such as e.g. wheels and/or propellers (e.g. the camera may form part of a drone), and the controller 1404 may be configured to transmit a signal to the corresponding motors, such that the position and/or orientation of the camera can be controlled. In some examples, at least one of the cameras may correspond to a spidercam suspended on a cable above the capture area, and the controller 1404 may be configured to transmit a signal to the one or more motors associated with the spidercam so as to control the position of the spidercam along a cable supporting the spidercam.

The intrinsics of the cameras may also be controlled remotely. For example, the controller 1404 may be configured to control a focal length of one or more cameras by transmitting a signal the cameras, indicating the adjustment in focal length.

It will be appreciated that free-viewpoint system 1400 of FIG. 14 may be a separate or supplementary system to that shown in FIG. 13. For example, a user may configure the controller 1404 separately and/or in advance of specifying a virtual camera pose. This may be the case where the scene layout is known and a user simply wishes to determine whether their current set up of cameras allows enough of the scene to be reconstructed in 3D. In some cases, it may be that some of the cameras are static and cannot easily be moved, and so a user may wish to determine quickly which areas of the capture volume would benefit from being captured by an additional camera. The disclosed data structure will allow the user to make this determination, since the user will be able to determine which voxels (and faces) are not associated with a camera pair, or are associated with a camera pair that provides a low depth resolution of a given voxel face.

Hence, in some embodiments, there is provided a free-viewpoint system comprising: a scene unit configured to obtain the intrinsics and extrinsics of a plurality of cameras arranged to capture a scene and based thereon, generate a voxel representation of the scene; wherein the voxel representation comprises a plurality of voxels and defines for at least some surfaces of the voxels, respective camera pairs that have been identified as being oriented towards those voxel surfaces and that are suitable for obtaining depth data for those voxel surfaces; a controller operable to communicate with each of the plurality of cameras, the controller being configured to receive an input from the scene unit, and in response to said input, determine whether the number of voxel surfaces associated with respective camera pair identifiers exceeds a threshold value; and wherein the controller is configured to adjust at least one of the extrinsics and or intrinsics of at least one camera, based on a determination that the number of voxel surfaces associated with respective camera pair identifiers is less than the threshold value.

In some examples, the voxel representation defines, for at least some surfaces of the voxels, an indication of the resolution of depth data that can be obtained for the respective camera pair identifiers associated with at least some voxel surfaces; and the controller is configured to adjust at least one of the intrinsics and extrinsics of one or more cameras, based on a determination that the depth resolution associated with one or more camera pairs is less than a threshold depth resolution.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A free-viewpoint system, comprising:
a scene unit configured to obtain the intrinsics and extrinsics of a plurality of cameras arranged to capture a scene and based thereon, generate a voxel representation of the scene, wherein the voxel representation comprises a plurality of voxels and defines for at least some surfaces of the voxels, a respective camera pair identifier for respective camera pairs that have been identified as being oriented towards the at least some surfaces of the voxels and that are suitable for obtaining depth data for the at least some surfaces of the voxels;
a virtual camera unit operable to obtain the extrinsics and intrinsics of a virtual camera;
a mapping unit operable to map the extrinsics and intrinsics of the virtual camera to at least one voxel surface defined in a data structure and to identify, based on a corresponding camera pair identifier, at least one camera pair suitable for reconstructing the scene from a viewpoint of the virtual camera and obtaining depth data for the at least one voxel surface; and
an image generator operable to receive an input from the mapping unit, and in response to said input, obtain images captured by the cameras in the at least one camera pair identified as being suitable for reconstructing the scene from the viewpoint of the virtual camera, and to generate an image of the scene from the viewpoint of the virtual camera based on the obtained images.

2. A free-viewpoint system according to claim 1, wherein the voxel representation defines, for each camera pair identifier associated with a respective voxel surface, a corresponding weighting indicating a resolution of depth data obtainable by the corresponding camera pair.

3. A free-viewpoint system according to claim 1, wherein:
the voxel representation corresponds to a hierarchical data structure, each successive layer of the hierarchical data structure corresponding to a sub-division of a respective voxel into a plurality of sub-voxels; and
at least some surfaces of the sub-voxels are associated with respective camera pair identifiers.

4. A free-viewpoint system according to claim 3, wherein each of the camera pair identifiers associated with the sub-voxel surfaces is associated with a weighting indicative of a resolution of depth data obtainable by the corresponding camera pair.

5. A free-viewpoint system according to claim 3, wherein the mapping unit is configured to map the extrinsics and intrinsics of the virtual camera to at least one sub-voxel surface and to identify, based on the camera pair identifier associated with the at least one sub-voxel surface, a corresponding camera pair suitable for obtaining depth data for the sub-voxel surface.

6. A free-viewpoint system according to claim 3, wherein:
the scene unit is configured to determine, based on the obtained extrinsics and intrinsics of the cameras, a depth coverage for each respective camera pair; and
the scene unit is configured to generate the voxel representation by dividing the scene into voxels based on the determined depth coverage.

7. A free-viewpoint system according to claim 6, wherein the scene unit is configured to determine, based on the obtained extrinsics and intrinsics of the cameras, one or more of:
i. a weighting associated with each camera pair providing depth coverage of a respective voxel, the weighting providing an indication of the depth resolution of the corresponding camera pair; and
ii. a directionality of each camera pair providing depth coverage of a respective voxel relative to one or more surfaces of the respective voxel,
wherein the scene unit is configured to determine, for each respective voxel surface, a camera pair that is oriented towards the respective voxel surface and has the highest weighting relative to the other camera pairs providing depth coverage of the respective voxel, and to assign to the respective voxel surface, a corresponding camera pair identifier.

8. A free-viewpoint system according to claim 1, further comprising:
a controller operable to communicate with each of the plurality of cameras, the controller being configured to receive an input from the scene unit, and in response to said input, determine whether a number of voxel surfaces associated with respective camera pair identifiers exceeds a threshold value; and
wherein the controller is configured to adjust at least one of the extrinsics and or intrinsics of one or more cameras, based on a determination that the number of voxel surfaces associated with respective camera pair identifiers is less than the threshold value.

9. A free-viewpoint system according to claim 8, wherein the voxel representation defines, for at least some surfaces of the voxels, an indication of a resolution of depth data obtainable for the respective camera pair identifiers associated with at least some voxel surfaces; and
wherein the controller is configured to adjust at least one of the intrinsics and extrinsics of one or more cameras, based on a determination that the resolution of depth data associated with one or more camera pairs is less than a threshold depth resolution.

10. A free-viewpoint system according to claim 1, comprising a display operable to display images generated by the image generator.

11. A free-viewpoint system according to claim 10, wherein the display comprises a head-mountable display; and wherein the virtual camera unit comprises a pose detector operable to detect a pose of the head-mountable display, the pose of the head-mountable display corresponding to the pose of the virtual camera for which a reconstruction of the scene from the viewpoint of the virtual camera is to be generated by the image generator.

12. A free-viewpoint system according to claim 1, comprising:
- a server operable to communicate with a client device, the server comprising the scene unit, mapping unit and image generator;
- a client device operable to communicate with the server;
- wherein the server is operable to communicate with the plurality of cameras and to receive images captured by the plurality of cameras;
- wherein the client device comprises the virtual camera unit and is operable to provide the extrinsics and intrinsics of the virtual camera to the server;
- wherein the server is configured to generate an image of the scene from the viewpoint of the virtual camera and to transmit the generated image to the client device.

* * * * *